(12) United States Patent
Yokoyama et al.

(10) Patent No.: US 10,162,469 B2
(45) Date of Patent: Dec. 25, 2018

(54) TOUCH SCREEN

(71) Applicant: NISSHA PRINTING CO., LTD., Kyoto (JP)

(72) Inventors: Takashi Yokoyama, Kyoto (JP); Takao Ichihara, Kyoto (JP); Kenji Okumura, Kyoto (JP); Kazuhiro Nishikawa, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 15/320,485

(22) PCT Filed: Nov. 18, 2015

(86) PCT No.: PCT/JP2015/082455
§ 371 (c)(1),
(2) Date: Dec. 20, 2016

(87) PCT Pub. No.: WO2016/103997
PCT Pub. Date: Jun. 30, 2016

(65) Prior Publication Data
US 2017/0277299 A1 Sep. 28, 2017

(30) Foreign Application Priority Data
Dec. 26, 2014 (JP) ................................ 2014-265906

(51) Int. Cl.
*G06F 3/044* (2006.01)
(52) U.S. Cl.
CPC .... *G06F 3/044* (2013.01); *G06F 2203/04112* (2013.01)

(58) Field of Classification Search
CPC ....................... G06F 3/044; G06F 2203/04112
See application file for complete search history.

(56) References Cited

U.S. PATENT DOCUMENTS

| 7,405,774 B2 * | 7/2008 | Cho ................... G02F 1/13338 349/119 |
| 2002/0054261 A1 * | 5/2002 | Sekiguchi ........... G02F 1/13338 349/122 |

(Continued)

FOREIGN PATENT DOCUMENTS

| JP | 11254576 A2 | 9/1999 |
| JP | 2002073282 A2 | 3/2002 |

(Continued)

OTHER PUBLICATIONS

International Search Report dated Dec. 28, 2015 filed in PCT/JP2015/082455.

*Primary Examiner* — Liliana Cerullo
(74) *Attorney, Agent, or Firm* — Rankin, Hill & Clark LLP (57) ABSTRACT

[Object] In a touch screen in which an electrode portion is formed on a base film, a pattern of the electrode portion is made less visible. [Solution] A touch screen 1 includes a first base film 11, a first transparent electrode 15, a second base film 13, a second transparent electrode 17, and a second intermediate base film 21. The first transparent electrode 15 is formed on the first base film 11. The second base film 13 is placed to face the first base film 11. The second transparent electrode 17 is formed on the second base film 13. The second intermediate base film 21 has a retardation value of 3000 nm or more and is placed so that a contraction direction thereof and contraction directions of the first base film 11 and the second base film 13 are matched.

11 Claims, 7 Drawing Sheets

(56) References Cited

U.S. PATENT DOCUMENTS

| | | | |
|---|---|---|---|
| 2010/0283949 A1* | 11/2010 | Uchiyama | G02B 5/3083 349/117 |
| 2012/0229732 A1 | 9/2012 | Koike et al. | |
| 2012/0241199 A1* | 9/2012 | Kobayashi | G06F 3/044 174/250 |
| 2013/0063684 A1 | 3/2013 | Chen et al. | |
| 2014/0354304 A1 | 12/2014 | Nishikawa | |
| 2015/0301385 A1* | 10/2015 | Tsunekawa | G02F 1/13363 349/12 |

FOREIGN PATENT DOCUMENTS

| | | |
|---|---|---|
| JP | 2013152690 A2 | 8/2013 |
| JP | 2013214173 A2 | 10/2013 |
| JP | 2014157281 A2 | 8/2014 |

\* cited by examiner

TOUCH SCREEN

TECHNICAL FIELD

The present invention relates to a touch screen.

BACKGROUND ART

A touch screen has been used in many cases for a liquid crystal display window of electronic equipment such as mobile information terminals such as PDAs and handy terminals, office automation equipment such as copiers and facsimiles, smartphones, mobile phones, portable game consoles, electronic dictionaries, car navigation systems, small PCs, digital cameras, video cameras, and portable MDs (PMDs). Among some types of touch screens, a capacitive touch screen is highly popular. This is because the capacitive touch screen has an excellent multi-touch function of enlarging and reducing an image by tapping, flicking, pinching a screen with a fingertip, an excellent visibility, and an excellent durability.

An example of the capacitive touch screen is disclosed in Patent Literature 1. In Patent Literature 1, a touch screen is realized as a capacitive film sensor 30, and this film sensor 30 is adhered to a back surface of a cover panel 12 placed in a liquid crystal display window of the electronic equipment described above, functioning as a dielectric, and having a light transmitting property.

In a third embodiment of Patent Literature 1, the film sensor 30 includes a base film 32, a first electrode portion 40 formed on a surface 32a of the base film 32, another base film 33 laminated on the other side of the base film 32, and a second electrode portion 45 formed on a surface 33a of the another base film 33.

CITATION LIST

Patent Literature

Patent Literature 1: JP-A-2013-214173

SUMMARY OF THE INVENTION

Problems to be Solved by the Invention

A thickness of a cover panel is generally large, and therefore it is necessary to secure a long distance between electrodes in order to improve a sensor sensitivity of a touch screen. In view of this, an intermediate base film is further provided between two base films of a film sensor in some cases. Such an intermediate base film is made of a material having low retardation or high retardation in order to improve visibility when polarized sunglasses are used.

The inventors of the present invention focused on a problem that, in the case where an intermediate base film is made of a material having high retardation, a wrinkle is formed in an electrode portion, and, as a result, the electrode portion can be visually observed.

The inventors of the present invention investigated a cause of the above problem and devised an invention for solving the problem as follows.

An object of the present invention is to make a pattern of an electrode portion less visible in a touch screen in which the electrode portion is formed on a base film.

Solution to the Problems

Hereinafter, a plurality of modes will be described as means for solving the problem. Those modes can be arbitrarily combined as necessary.

A touch screen according to an aspect of the present invention includes a first resin film, a first detection electrode, a second resin film, a second detection electrode, and a third resin film.

The first detection electrode is formed on the first resin film.

The second resin film is placed to face the first resin film.

The second detection electrode is formed on the second resin film.

The third resin film has a retardation value of 3000 nm or more and is placed so that a contraction direction of the third resin film and contraction directions of the first resin film and the second resin film are matched. Note that matching of the contraction directions means a state in which both the contraction directions are parallel or substantially parallel with each other.

In a typical touch screen, there is a problem in that, in the case where a third resin film having high retardation is used, a wrinkle is generated in a first detection electrode or a second detection electrode, and, as a result, the first detection electrode or the second detection electrode is visually observed in some cases. A reason for this is as follows. Specifically, in high temperature and high humidity conditions, contraction directions of the first resin film and the second resin film are TD, whereas a contraction direction of the third resin film having high retardation is MD, and therefore both the films are placed so that the contraction directions thereof are different from each other. In the first resin film and the second resin film, for example, moisture is not easily moved because a hard coat and ITO exist, and therefore, when the contraction directions thereof are different from that of the third resin film, stress generated when a high temperature and a high humidity are cooled to a room temperature is increased.

In view of this, in this touch screen, the third resin film is placed so that the contraction direction thereof and the contraction directions of the first resin film and the second resin film are matched.

With this, patterns of the electrodes are made less visible after a reliability test.

The third resin film may be placed between the first resin film and the second resin film.

In this case, a length between the first resin film and the second resin film is adjustable by the third resin film.

The third resin film may be placed outside a region between the first resin film and the second resin film.

Effects of the Invention

In a touch screen according to the present invention, a pattern of an electrode portion is made less visible.

DESCRIPTION OF EMBODIMENTS

1. First Embodiment

Figure 1:
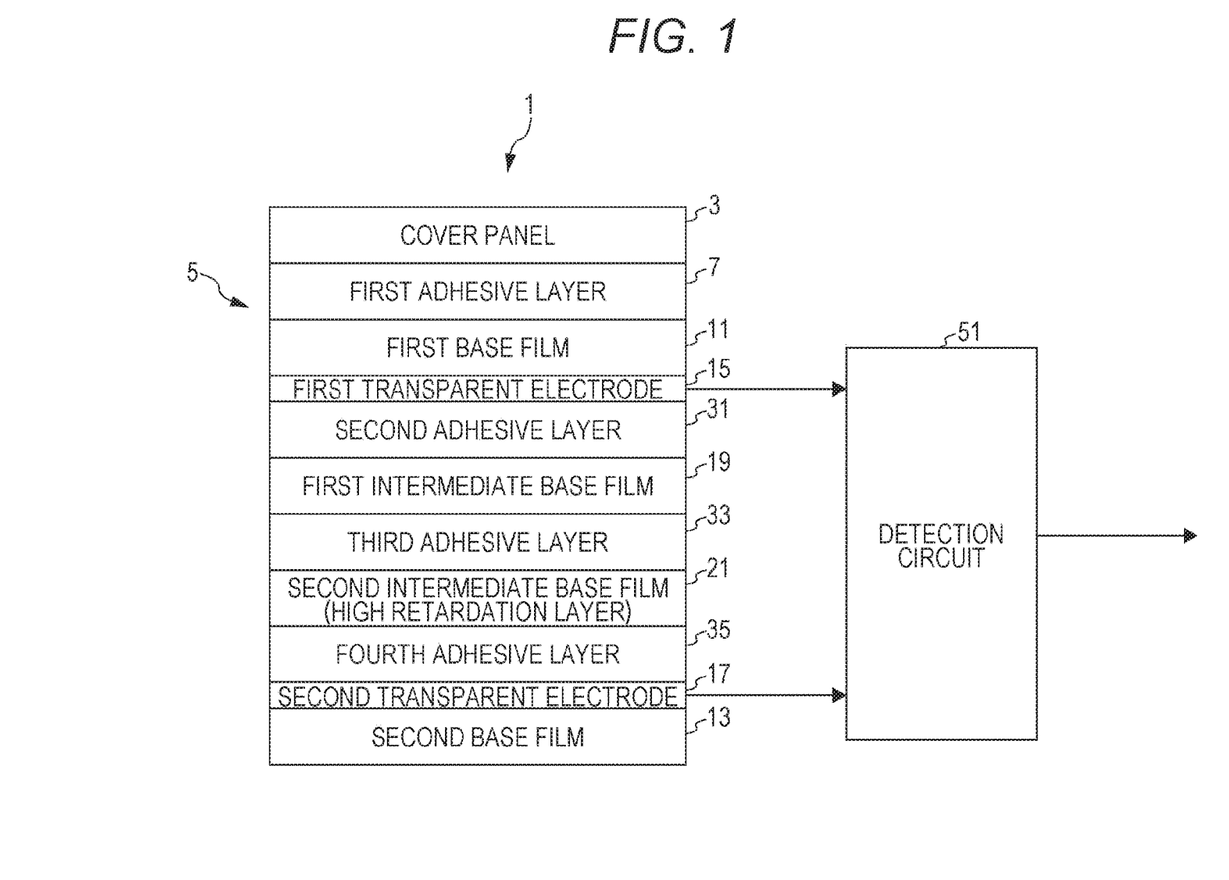
FIG. 1 is a schematic configuration diagram of a touch screen in a first embodiment.

An embodiment of a capacitive touch screen in a first embodiment will be described with reference to FIG. 1. FIG. 1 is a schematic configuration diagram of the touch screen in the first embodiment.

A touch screen 1 according to an aspect of the present invention includes a first base film 11 (example of first resin film), a first transparent electrode 15 (example of first detection electrode), a second base film 13 (example of second resin film), a second transparent electrode 17 (example of second detection electrode), and a second intermediate base film 21 (example of third resin film).

Specifically, the touch screen 1 includes a cover panel 3 and a film sensor 5 having the above configuration (first base film 11, first transparent electrode 15, second base film 13, second transparent electrode 17, and second intermediate base film 21) attached to a back surface thereof. The film sensor 5 may be any one of a self capacitance type and a mutual capacitance type.

The film sensor 5 is attached on the back surface side of the cover panel 3. For the cover panel 3, a cover glass made of a glass plate or a plastic cover made of a plastic sheet is normally used. A resin for use in the plastic sheet is, for example, thermoplastic resin that is softened with heat to be caused to flow and can be formed with a mold and is solidified when the thermoplastic resin is cooled, such as polymethyl methacrylate (PMMA), polycarbonate, a cyclic olefin polymer, alicyclic methacrylate, and HEMA hydroxyethyl methacrylate (PHEMA). Further, thermosetting resin that is chemically changed by heat to a mesh-like molecular structure, such as diethylene glycol diallyl carbonate (ADC) and siloxanyl methacrylate (SiMA), photosetting resin that is cured by ultraviolet radiation or the like at a room temperature, and the like can be used. In particular, PMMA and PC are generally well known as typical examples of a transparent plastic that is optically used. PMMA has excellent transparency and also has small birefringence that is an optical distortion. PC has high heat resistance.

A thickness of the cover panel 3 falls within the range of 500 μm to 2000 μm.

In this embodiment, a first adhesive layer 7 is provided on the back surface of the cover panel 3. The first adhesive layer 7 is, for example, a transparent optical adhesive. An example thereof is a pressure sensitive adhesive (hereinafter, referred to as "PSA"). Examples of a material of the first adhesive layer 7 encompass acrylic-based, silicone-based, and epoxy-based adhesives and urethane-based adhesives.

The second base film 13 is placed to face the first base film 11. Specifically, the first base film 11 is placed on the cover panel 3 side, and the second base film 13 is placed far from the cover panel 3. The first base film 11 and the second base film 13 are placed so that MDs (machine directions: flow directions) thereof are parallel with each other. Therefore, TDs (transverse directions: vertical directions) are also parallel with each other.

The first transparent electrode 15 is formed on the first base film 11. Specifically, the first transparent electrode 15 has a conductor arranged in a predetermined pattern on a surface of the first base film 11. The second transparent electrode 17 is formed on the second base film 13. The second transparent electrode 17 has a conductor arranged in a predetermined pattern on a surface of the second base film 13. The first transparent electrode 15 and the second transparent electrode 17 are connected to a detection circuit 51.

The second intermediate base film 21 has a retardation value of 3000 nm or more and is placed so that an MD thereof and the MDs of the first base film 11 and the second base film 13 intersect with each other. In this embodiment, the second intermediate base film 21 is placed between the first base film 11 and the second base film 13.

As materials of the first base film 11, the second base film 13, and the second intermediate base film 21, transparent films made of, for example, polyester (PET), polyimide (PI), polyether sulfone (PES), polyetheretherketone (PEEK), polycarbonate (PC), polypropylene (PP), polyamide (PA), polyacryl (PAC) or norbornene-based transparent thermoplastic resin or laminated bodies thereof are used. A cycloolefin polymer (COP) and a cycloolefin copolymer (COC) are also usable.

Thicknesses of the first base film 11, the second base film 13, and the second intermediate base film 21 fall within the range of 25 μm to 800 μm.

Materials of the first transparent electrode 15 and the second transparent electrode 17 preferably have a light transmittance (light transmitting property) of 80% or more and a surface resistance value (conductivity) of several mΩ to several hundreds of Ω. Films of the first transparent electrode 15 and the second transparent electrode 17 can be formed of, for example, metal oxides such as an indium oxide, a tin oxide, an indium tin oxide (ITO), and tin antimonate or metal such as gold, silver, copper, platinum, palladium, aluminum, and rhodium. As a method of forming the first transparent electrode 15 and the second transparent electrode 17 made of those materials, there are a method in which a transparent conductive film is formed by a PVD method such as a sputtering method, a vacuum deposition method, or an ion plating method, a CVD method, a coating method, or the like and is then patterned by etching, a printing method, and the like.

The touch screen 1 further includes a first intermediate base film 19 placed between the second intermediate base film 21 and the first base film 11. The first intermediate base film 19 can be made of the same material as those of the first base film 11 and the second base film 13.

A second adhesive layer 31 is provided between the first base film 11 and the first intermediate base film 19. A third adhesive layer 33 is provided between the first intermediate base film 19 and the second intermediate base film 21. A fourth adhesive layer 35 is provided between the second intermediate base film 21 and the second base film 13. The second adhesive layer 31, the third adhesive layer 33, and the fourth adhesive layer 35 can be made of the same material as that of the first adhesive layer 7.

A thickness of each adhesive layer falls within the range of 25 μm to 175 μm.

Retardation values of the first base film 11, the second base film 13, and the first intermediate base film 19 are, for example, 10 nm or less. Meanwhile, a retardation value of the second intermediate base film 21 falls within the range of, for example, 3000 nm to 12000 nm.

In a typical touch screen, there is a problem in that, in the case where the second intermediate base film 21 having high retardation is used, a wrinkle is generated in the first transparent electrode 15 or the second transparent electrode 17, and, as a result, the first transparent electrode 15 or the second transparent electrode 17 is visually observed in some cases. This is because, in the typical touch screen, in high temperature and high humidity conditions, contraction directions of the first base film 11 and the second base film 13 are TD, whereas a contraction direction of the second intermediate base film 21 is MD, and those films are placed so that the contraction directions thereof are different from each other.

Figure 2:
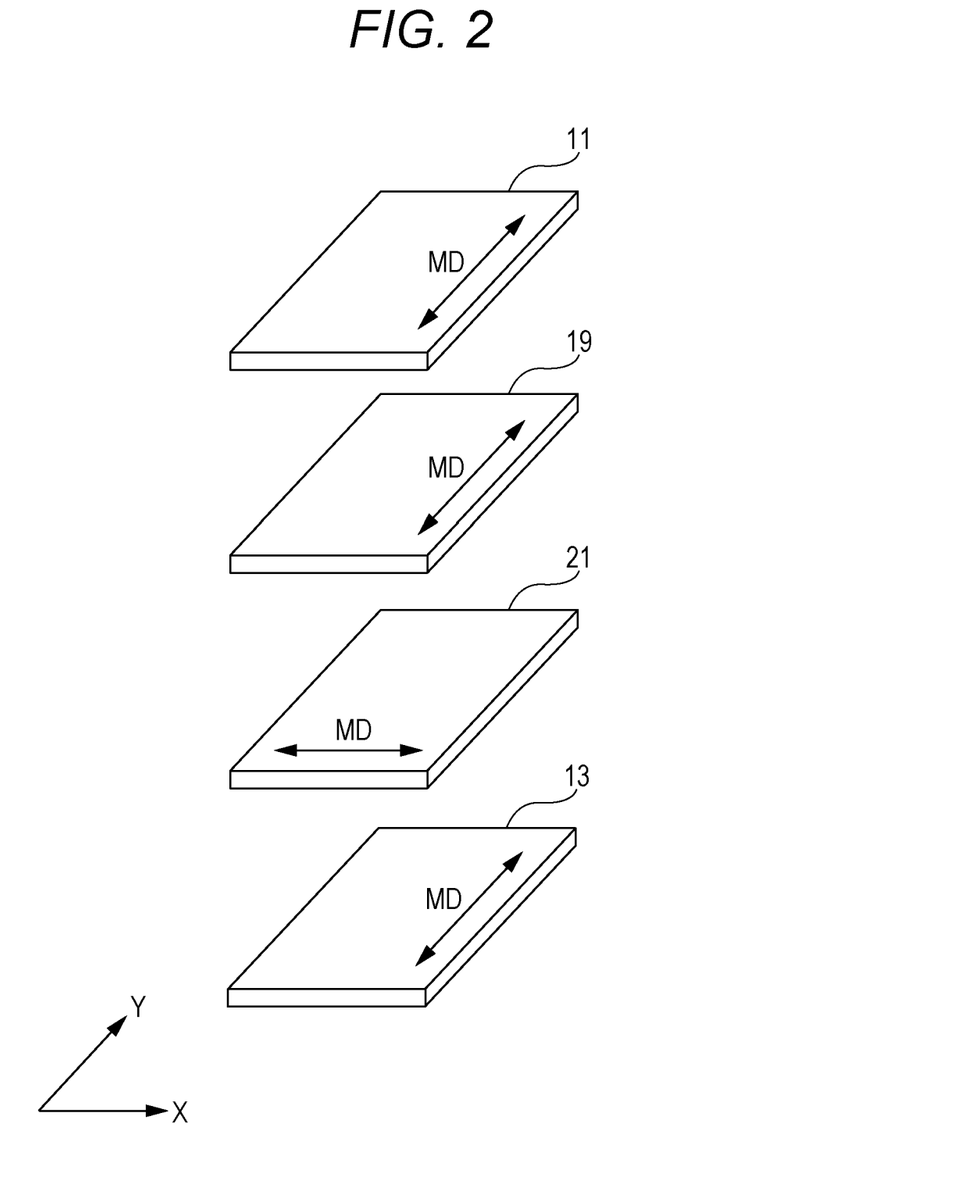
FIG. 2 is a schematic perspective view showing MDs of base films.

Hereinafter, a relationship between MDs of base films will be described with reference to FIG. 2. FIG. 2 is a schematic perspective view showing the MDs of the base films. In FIG. 2, an X direction and a Y direction are shown as horizontal directions orthogonal to each other.

In this embodiment, the second intermediate base film 21 is placed so that the MD thereof and the MDs of the first base film 11 and the second base film 13 intersect with each other. More specifically, as shown in FIG. 2, the MDs of the first base film 11 and the second base film 13 are parallel with the Y direction, and the MD of the second intermediate base film 21 is parallel with the X direction. In other words, the second intermediate base film 21 is placed so that the MD thereof is orthogonal to the MDs of the first base film 11 and the second base film 13. The wording "orthogonal" herein includes 90 degrees and the range of 90 degrees±several degrees.

Note that, in this embodiment, the MD of the first intermediate base film 19 is parallel with the MDs of the first base film 11 and the second base film 13. However, both the MDs may be orthogonal to each other.

With this, for example, the contraction directions of the first base film 11 and the second base film 13 (TD, i.e., a direction orthogonal to the MD, which is a left and right direction in FIG. 2) and the contraction direction of the second intermediate base film 21 (MD, i.e., the left and right direction in FIG. 2) are matched in a reliability test. As a result, no wrinkle is generated in the first transparent electrode 15 or the second transparent electrode 17. Therefore, patterns of the first transparent electrode 15 and the second transparent electrode 17 are made less visible.

In this embodiment, the second intermediate base film 21 is placed between the first base film 11 and the second base film 13. In this case, a length between the first base film 11 and the second base film 13 is adjustable by the second intermediate base film 21.

2. Second Embodiment

In the first embodiment, not only the second intermediate base film but also the first intermediate base film is placed between the first base film and the second base film. However, a single intermediate base film may be provided. Hereinafter, such an embodiment will be described.

Figure 3:
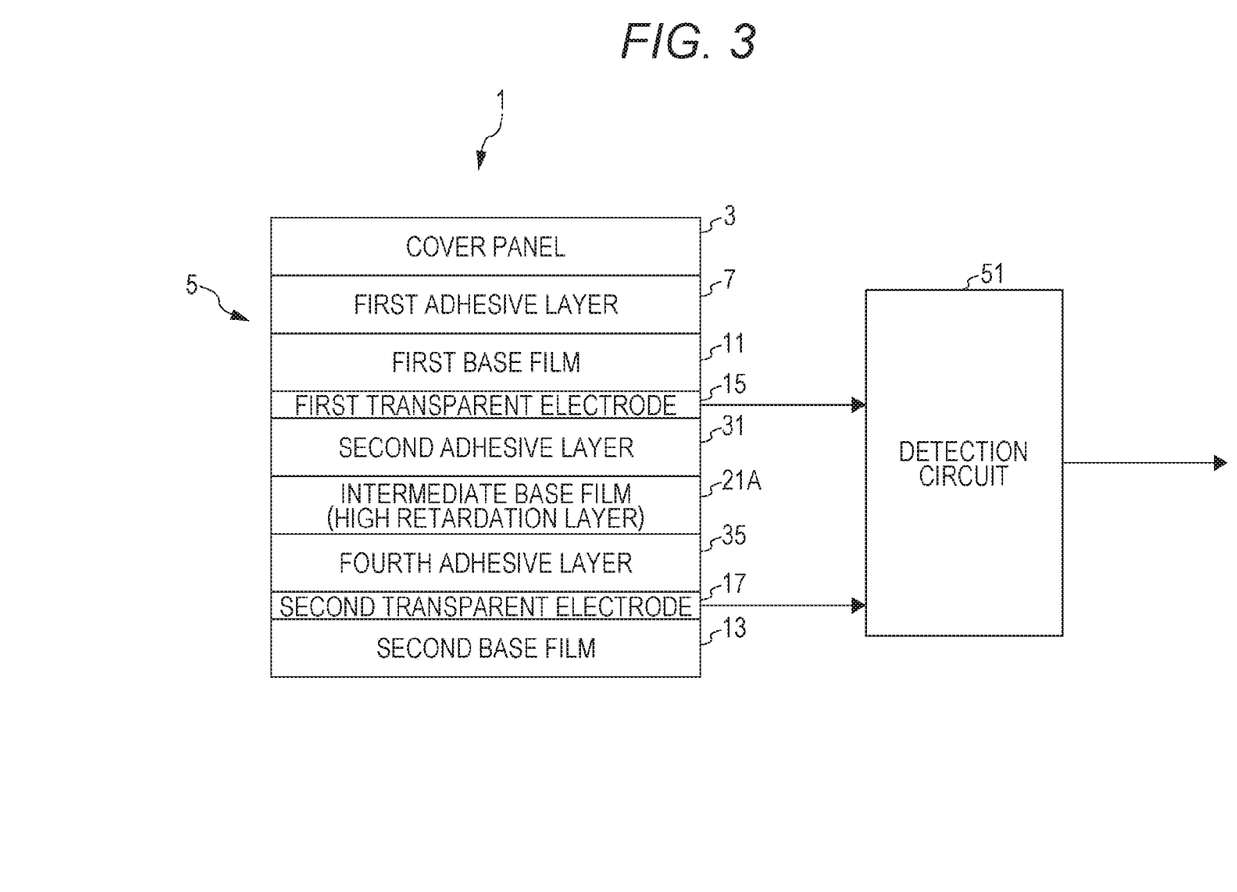
FIG. 3 is a schematic configuration diagram of a touch screen in a second embodiment.
Figure 4:
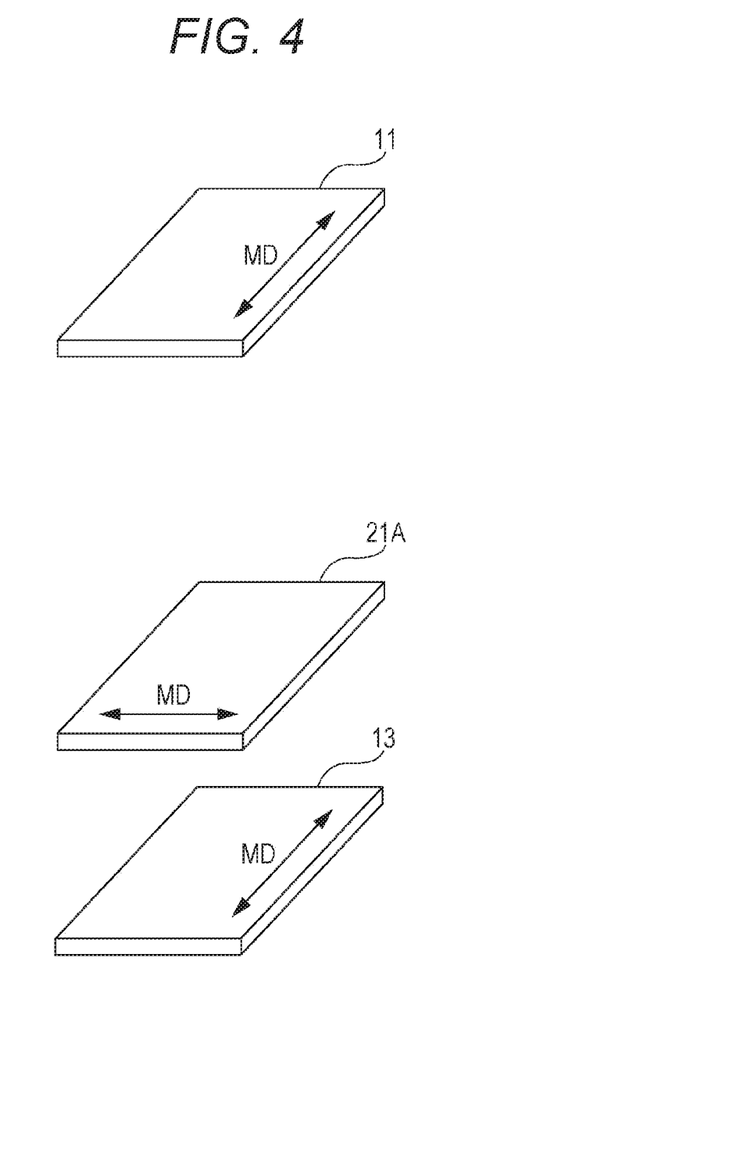
FIG. 4 is a schematic perspective view showing MDs of base films.

As shown in FIG. 3 and FIG. 4, an intermediate base film 21A is provided between the first base film 11 and the second base film 13. FIG. 3 is a schematic configuration diagram of a touch screen in a second embodiment. FIG. 4 is a schematic perspective view showing MDs of base films.

A material and a configuration of the intermediate base film 21A are the same as the material and the configuration of the second intermediate base film 21 in the first embodiment. Specifically, a retardation value of the intermediate base film 21A falls within the range of, for example, 3000 nm to 12000 nm.

The intermediate base film 21A is placed so that an MD thereof and the MDs of the first base film 11 and the second base film 13 intersect with each other. More specifically, as shown in FIG. 4, in the case where the MDs of the first base film 11 and the second base film 13 are parallel with the Y direction, the intermediate base film 21A is placed so that the MD thereof is parallel with the X direction and is orthogonal to the MDs of the first base film 11 and the second base film 13.

With this, for example, contraction directions of the first base film 11 and the second base film 13 (TD, i.e., a direction orthogonal to MD, which is a left and right direction in FIG. 4) and a contraction direction of the intermediate base film 21A (MD, i.e., the left and right direction in FIG. 4) are matched in a reliability test. As a result, no wrinkle is generated in the first transparent electrode 15 or the second transparent electrode 17. Therefore, patterns of the first transparent electrode 15 and the second transparent electrode 17 are made less visible.

3. Third Embodiment

Figure 5:
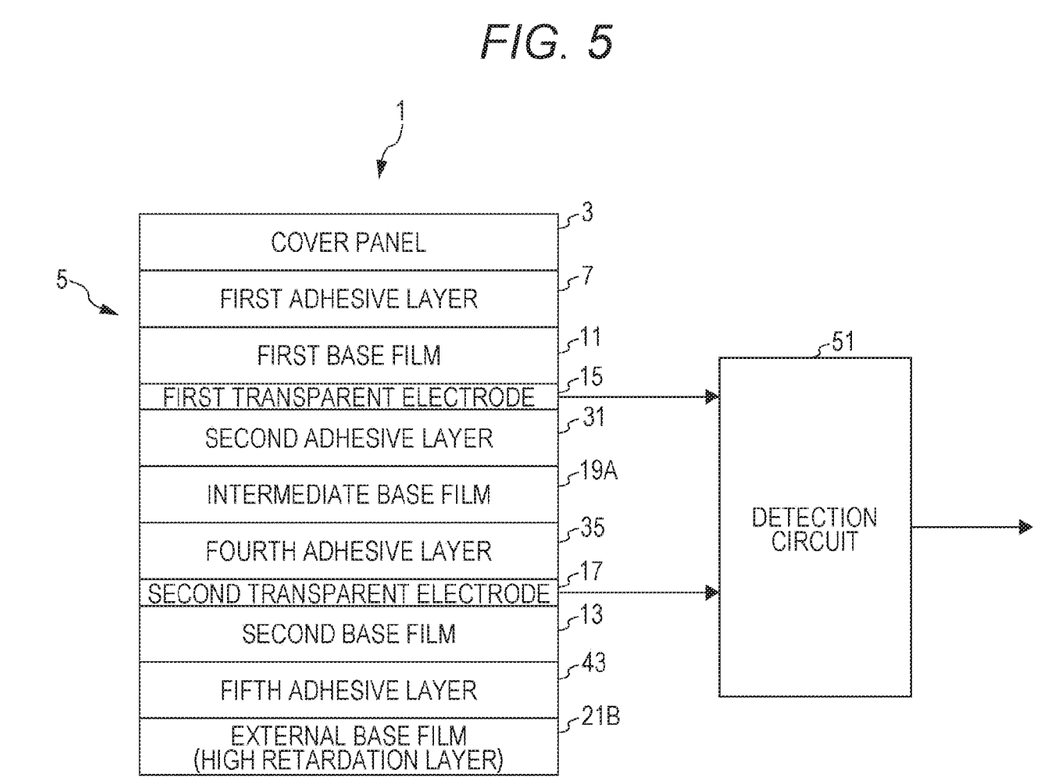
FIG. 5 is a schematic configuration diagram of a touch screen in a third embodiment.

In the first embodiment and the second embodiment, the base film having high retardation is placed between the first base film and the second base film. However, the present invention is not limited to those embodiments. Hereinafter, an embodiment in which a base film having high retardation is provided outside a region between a first base film and a second base film will be described with reference to FIG. 5. FIG. 5 is a schematic configuration diagram of a touch screen in a third embodiment.

As shown in FIG. 5, an external base film 21B is fixed to the back surface of the second base film 13 via a fifth adhesive layer 43. A retardation value of the external base film 21B falls within the range of, for example, 3000 nm to 12000 nm.

In this embodiment, an intermediate base film 19A is provided, and a retardation value thereof is, for example, 10 nm or less. Note that the intermediate base film 19A can be omitted.

This embodiment can obtain the same effect as those of the first embodiment and the second embodiment.

4. Common Matters

The above-described first to third embodiments have the following configuration and function in common.

A touch screen according to an aspect of the present invention includes a first resin film (for example, first base film 11), a first detection electrode (for example, first transparent electrode 15), a second resin film (second base film 13), a second detection electrode (second transparent electrode 17), and a third resin film (for example, second intermediate base film 21, intermediate base film 21A, and external base film 21B).

The first detection electrode is formed on the first resin film.

The second resin film is placed to face the first resin film.

The second detection electrode is formed on the second resin film.

The third resin film has a retardation value of 3000 nm or more and is placed so that a contraction direction of the third resin film and contraction directions of the first resin film and the second resin film are matched.

With this, for example, the contraction directions of the first resin film, the second resin film, and the third resin film in a reliability test are matched. Therefore, patterns of the electrodes are made less visible.

Example

Regarding a touch screen having the configuration of the first embodiment, whether or not an electrode pattern was observed after a high-temperature high-humidity shelf test (85° C. 90% 24 h) was verified. A thickness of each layer is as follows.

Cover panel 3: 2000 μm
First adhesive layer 7: 175 μm
First base film 11: 75 μm
Second adhesive layer 31: 75 μm
First intermediate base film 19: 500 μm
Third adhesive layer 33: 75 μm
Second intermediate base film: 300 μm
Fourth adhesive layer: 75 μm
Second base film: 75 μm By using the above-described conditions as common conditions, in a reference example, an MD of the second intermediate base film and MDs of the first base film and the second base film were set to be parallel with each other. In other words, both the films were placed so that contraction directions thereof were different from each other. Meanwhile, in an example, an MD of the second intermediate base film and MDs of the first base film and the second base film were set to be orthogonal to each other. In other words, both the films were placed so that contraction directions thereof were the same.

Figure 6:
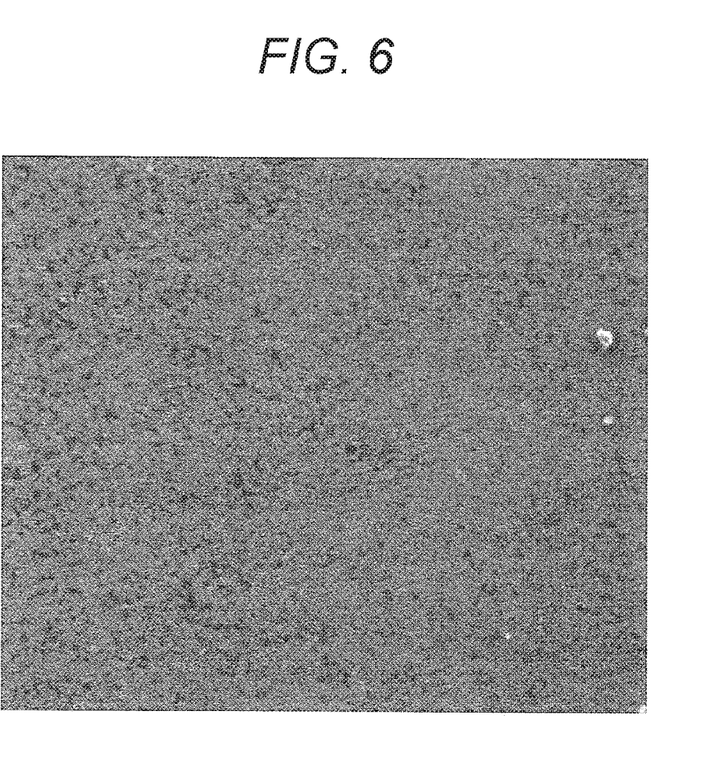
FIG. 6 is a photograph of a surface of a touch screen in an example of the present invention.
Figure 7:
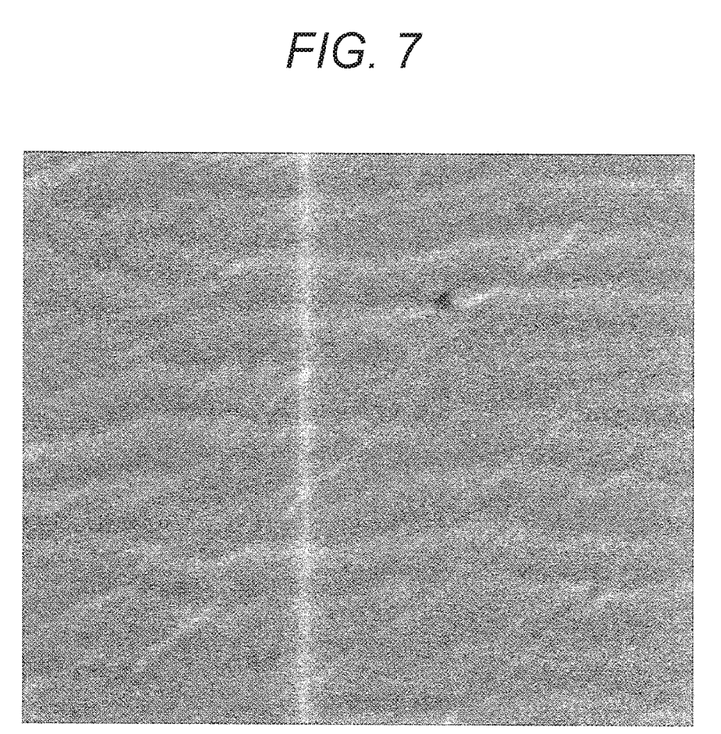
FIG. 7 is a photograph of a surface of a touch screen in a conventional example.

Results of the above-described experiments are shown in FIG. 6 and FIG. 7. FIG. 6 is a photograph of a surface of the touch screen in the example of the present invention. FIG. 7 is a photograph of a surface of the touch screen in the reference example.

The touch screen of the present invention was a favorable state, that is, no wrinkle was generated as shown in FIG. 6. Meanwhile, in the touch screen of the reference example, the great number of wrinkles were generated as shown in FIG. 7.

5. Another Embodiment

Hereinabove, embodiments of the present invention have been described. However, the present invention is not limited to the above-described embodiments. It is possible to make various modifications within the scope of the invention. In particular, it is possible to arbitrarily combine the plurality of embodiments and modification examples described in this specification as necessary.

Any base film is not limited to a single layer resin film and may be a laminated body of a plurality of resin films.

Further, regarding a layer configuration of a touch screen, i.e., a film sensor, the number, kinds, positions, thicknesses, and the like of layers are not limited to the above-described embodiments.

INDUSTRIAL APPLICABILITY

The present invention is widely applicable to a touch screen including a high retardation layer.

DESCRIPTION OF REFERENCE SIGNS

1: touch screen
3: cover panel
5: film sensor
11: first base film
13: second base film
15: first transparent electrode
17: second transparent electrode
21: second intermediate base film
21A: intermediate base film
21B: external base film

The invention claimed is:

1. A touch screen comprising:
    a first resin film comprising a first detection electrode formed on the first resin film;
    a second resin film placed to face the first resin film and comprising a second detection electrode formed on the second resin film;
    a third resin film having a retardation value of 3000 nm or more and placed between the first resin film and the second resin film so that a contraction direction of the third resin film and contraction directions of the first resin film and the second resin film are matched;
    a first adhesive layer between the third resin film and the first resin film comprising the first detection electrode, the first adhesive layer extending over an entirety of a surface of the first resin film and being in contact with the first detection electrode;
    a second adhesive layer between the third resin film and the second resin film comprising the second detection electrode, the second adhesive layer extending over an entirety of a surface of the second resin film and being in contact with the second detection electrode, wherein
    the first detection electrode and the second detection electrode face each other to sandwich the third resin film.

2. The touch screen according to claim 1, wherein the first detection electrode is in direct contact with the first resin film.

3. The touch screen according to claim 1, wherein the second detection electrode is in direct contact with the second resin film.

4. The touch screen according to claim 1, wherein the first detection electrode comprises a conductor arranged on a surface of the first resin film.

5. The touch screen according to claim 1, wherein the second detection electrode comprises a conductor arranged on a surface of the second resin film.

6. The touch screen according to claim 1, wherein the first detection electrode comprises a first conductor having a predetermined pattern arranged on a surface of the first resin film, and the second detection electrode comprises a second conductor having a predetermined pattern arranged on a surface of the second resin film.

7. The touch screen according to claim 1, wherein the touch screen is a capacitive touch screen.

8. The touch screen according to claim 1, wherein the first detection electrode is in direct contact with the first resin film, and the second detection electrode is in direct contact with the second resin film.

9. The touch screen according to claim 1, wherein the third resin film is placed between the first detection electrode and the second detection electrode.

10. The touch screen according to claim 1, wherein the
    first adhesive layer is in direct contact with an entirety of a surface of the third resin film; and
    the second adhesive layer is in direct contact with an entirety of another surface of the third resin film.

11. A touch screen comprising:
    a first resin film;
    a first detection electrode formed on the first resin film;
    a second resin film placed to face the first resin film;
    a second detection electrode formed on the second resin film; and
    a third resin film having a retardation value of 3000 nm or more and placed between the first detection electrode and the second detection electrode, wherein a contraction direction of the third resin film and contraction directions of the first resin film and the second resin film are matched.

\* \* \* \* \*